(12) United States Patent
Chun et al.

(10) Patent No.: US 12,278,052 B2
(45) Date of Patent: Apr. 15, 2025

(54) MULTILAYER ELECTRONIC COMPONENT

(71) Applicant: SAMSUNG ELECTRO-MECHANICS CO., LTD., Suwon-si (KR)

(72) Inventors: Hee Sun Chun, Suwon-si (KR); Jin Woo Kim, Suwon-si (KR); Tae Hyung Kim, Suwon-si (KR); Hyo Ju Lee, Suwon-si (KR); Seok Hyun Yoon, Suwon-si (KR); Jeong Ryeol Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 159 days.

(21) Appl. No.: 18/123,027

(22) Filed: Mar. 17, 2023

(65) Prior Publication Data
US 2024/0203649 A1    Jun. 20, 2024

(30) Foreign Application Priority Data
Dec. 15, 2022   (KR) ........................ 10-2022-0176005

(51) Int. Cl.
*H01G 4/12* (2006.01)
*H01G 4/012* (2006.01)
*H01G 4/30* (2006.01)

(52) U.S. Cl.
CPC ........... *H01G 4/1227* (2013.01); *H01G 4/012* (2013.01); *H01G 4/30* (2013.01)

(58) Field of Classification Search
None
See application file for complete search history.

(56) References Cited

U.S. PATENT DOCUMENTS

| | | |
|---|---|---|
| 5,225,960 A | 7/1993 | Kishi et al. |
| 5,734,545 A | 3/1998 | Sano et al. |
| 5,742,473 A | 4/1998 | Sano et al. |
| (Continued) | | |

FOREIGN PATENT DOCUMENTS

| | | |
|---|---|---|
| JP | 3207847 B2 | 9/2001 |
| KR | 10-2022-0088099 A | 6/2022 |

OTHER PUBLICATIONS

Hiroshi Kishi et al., "Base-Metal Electrode-Multilayer Ceramic Capacitors: Past, Present and Future Perspectives," Japanese Journal of Applied Physics, No. 42, vol. 1 (2003).

*Primary Examiner* — Eric W Thomas
(74) *Attorney, Agent, or Firm* — Morgan, Lewis & Bockius LLP

(57) ABSTRACT

A multilayer electronic component includes a body including a dielectric layer including a plurality of dielectric grains and internal electrodes alternately disposed with the dielectric layer in a first direction and external electrodes disposed on the body, wherein at least one of the plurality of dielectric grains has a core-shell structure including an inner core and a shell covering at least a portion of the core, a ratio of an average size of the core to an average size of the dielectric grains having the core-shell structure is 0.4 or more and 0.8 or less, a ratio ((Dy+Tb)/Sn) of the sum of the moles of dysprosium (Dy) and the moles of terbium (Tb) to the moles of tin (Sn) included in the dielectric layer satisfies 0.7 or more and 1.5 or less, and at least one of the dielectric layers has four or more dielectric grains in the first direction.

20 Claims, 5 Drawing Sheets

(56) References Cited

U.S. PATENT DOCUMENTS

| | | |
|---|---|---|
| 5,815,368 A | 9/1998 | Sakamoto et al. |
| 5,818,686 A | 10/1998 | Mizuno et al. |
| 5,862,034 A | 6/1999 | Sato et al. |
| 6,243,254 B1 | 6/2001 | Wada et al. |
| 6,346,497 B1 | 2/2002 | Nakamura et al. |
| 6,380,116 B1 | 4/2002 | Okamatsu et al. |
| 6,485,672 B1 | 11/2002 | Nomura et al. |
| 6,548,437 B2 | 4/2003 | Sato et al. |
| 2018/0130601 A1* | 5/2018 | Kim .................... C04B 35/6281 |
| 2022/0189694 A1* | 6/2022 | Kim .................. C04B 35/62805 |
| 2022/0199326 A1 | 6/2022 | Kim et al. |
| 2024/0339264 A1* | 10/2024 | Kim ........................ H01G 4/30 |

\* cited by examiner

I-I'

II-II'

MULTILAYER ELECTRONIC COMPONENT

CROSS-REFERENCE TO RELATED APPLICATION

This application claims benefit of priority to Korean Patent Application No. 10-2022-0176005 filed on Dec. 15, 2022 in the Korean Intellectual Property Office, the disclosure of which is incorporated herein by reference in its entirety.

BACKGROUND

1. Technical Field

The present disclosure relates to a multilayer electronic component.

2. Description of Related Art

A multilayer ceramic capacitor (MLCC), a multilayer electronic component, is a chip-type capacitor mounted on the printed circuit boards of various types of electronic products such as imaging devices including liquid crystal displays (LCDs) and plasma display panels (PDPs), computers, smartphones, cell phones, and the like, to allow electricity to be charged therein and discharged therefrom.

Such an MLCC may be used as a component of various electronic devices due to advantages thereof such as compactness, guaranteed high capacitance, and ease of mounting. As various electronic devices such as computers and mobile devices have been reduced in size and increased in power, demand for miniaturization and high capacitance of MLCCs has increased.

In the case of recently developed micro-products, a thin-layer design application has reached its limit, and it is necessary to maximize additional characteristics of products under the condition of a minimum design thickness to secure the basic reliability of products. Therefore, research into design changes from a material point of view has been actively conducted. In the related art, characteristics of products are intended to be stabilized using ultra-fine base material in thin-layer design models, but it may be difficult to control a grain growth rate and processes causing particles to over-grow have been applied to attain high permittivity.

Therefore, in order to solve the above problems, it is necessary to improve dielectric properties of dielectrics and increase effective permittivity (decrease in permittivity reduction) that may be realized under a constant voltage application condition and it is necessary to improve characteristics of a core without a lattice having a large contribution to the improvement of permittivity in dielectric materials.

SUMMARY

An aspect of the present disclosure may provide a multilayer electronic component having improved permittivity by improving a core ratio of small dielectric grains.

An aspect of the present disclosure may also provide a multilayer electronic component having characteristics maximized by controlling a grain growth rate, size and distribution of dielectric particles by improving a core ratio of dielectric grains by optimizing a dielectric powder manufacturing process and limiting various composition components.

According to an aspect of the present disclosure, a multilayer electronic component may include: a body including a dielectric layer including dielectric grains and internal electrodes alternately disposed with the dielectric layer in a first direction; and external electrodes disposed on the body, wherein at least one of the dielectric grains has a core-shell structure including an inner core and a shell covering at least a portion of the inner core, a ratio of an average size of the inner core to an average size of the at least one dielectric grain having the core-shell structure is 0.4 or more and 0.8 or less, a ratio ((Dy+Tb)/Sn) of a sum of a number of moles of dysprosium (Dy) and a number of moles of terbium (Tb) to a number of moles of tin (Sn) included in the dielectric layer satisfies 0.7 or more and 1.5 or less, and the dielectric layer has four or more dielectric grains in the first direction.

According to another aspect of the present disclosure, a multilayer electronic component may include: a body including a dielectric layer including dielectric grains and internal electrodes alternately disposed with the dielectric layer in a first direction; and external electrodes disposed on the body, wherein at least one of the dielectric grains has a core-shell structure including an inner core and a shell covering at least a portion of the inner core, a ratio of an average size of the inner core to an average size of the at least one dielectric grain having the core-shell structure is 0.4 or more and 0.8 or less, a ratio (RE/Sn) of a number of moles of rare earth element (RE) to a number of moles of tin (Sn) included in the dielectric layer satisfies 0.7 or more and 1.5 or less, and the dielectric layer has four or more dielectric grains in the first direction.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
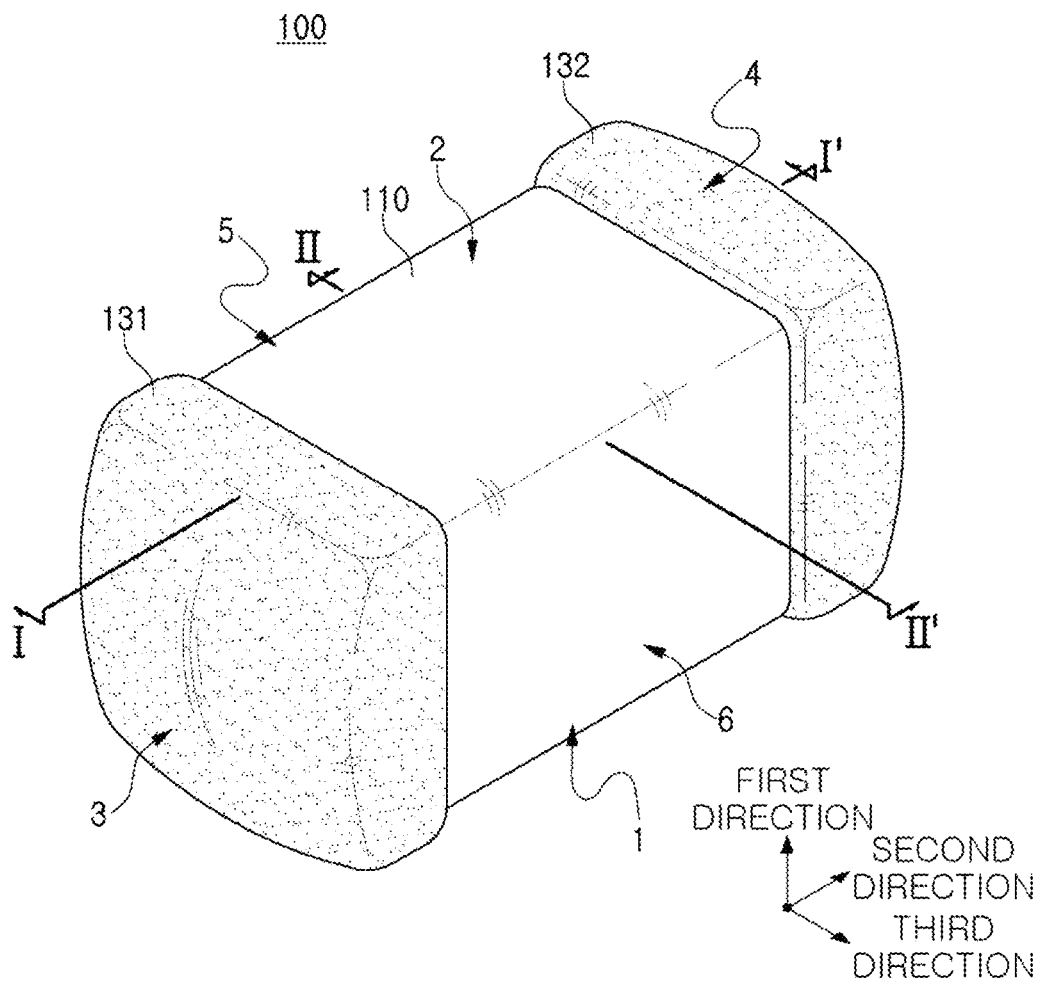
FIG. 1 is a perspective view schematically illustrating a multilayer electronic component according to an exemplary embodiment in the present disclosure.

Hereinafter, exemplary embodiments of the present disclosure will be described in detail with reference to the accompanying drawings.

In the drawings, a first direction may be defined as a stacking direction or a thickness (T) direction, a second direction may be defined as a length L direction, and a third direction may be defined as a width (W) direction.

Multilayer Electronic Component

FIG. 1 is a perspective view schematically illustrating a multilayer electronic component according to an exemplary embodiment in the present disclosure.

Figure 2:
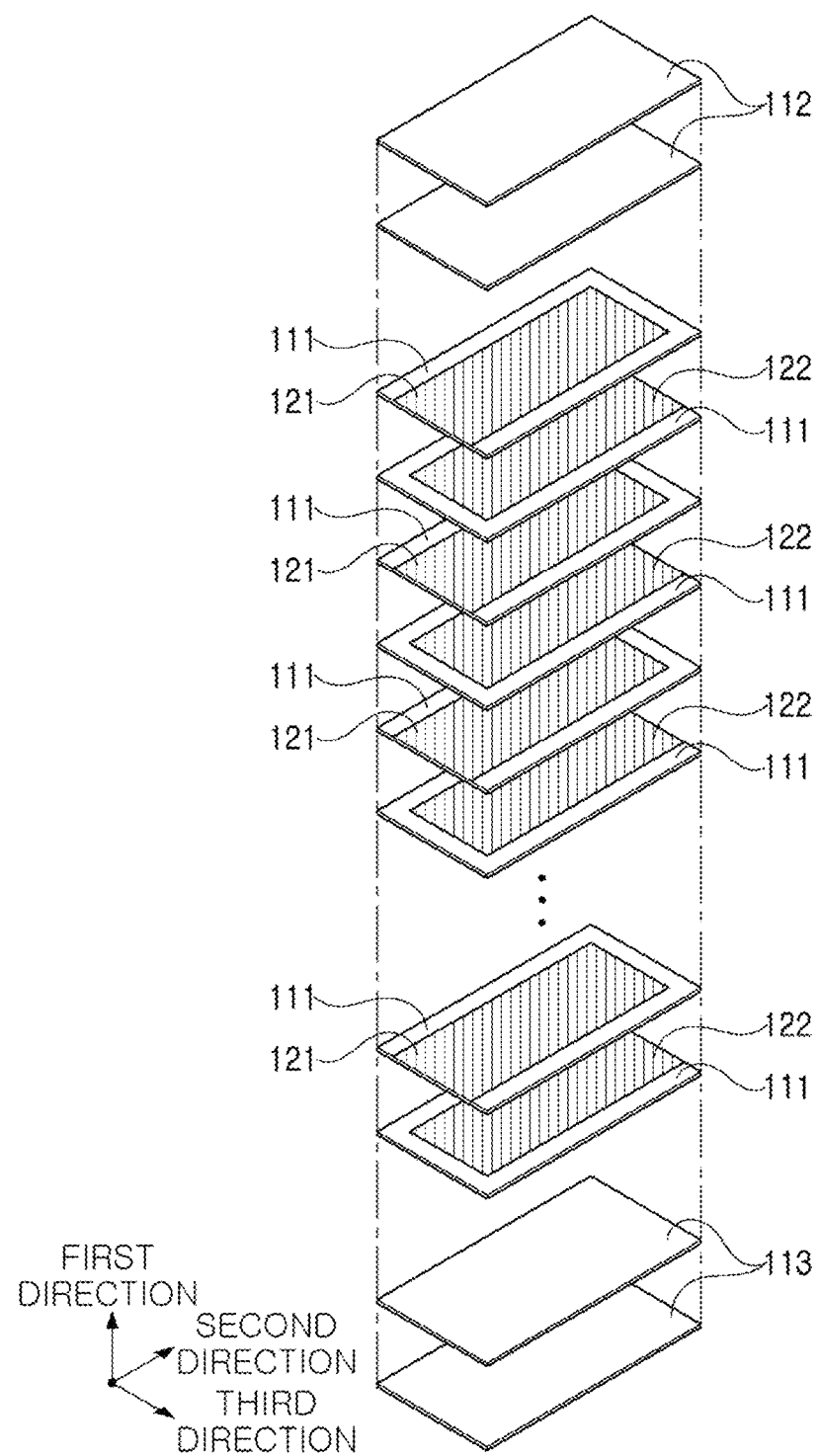
FIG. 2 is an exploded perspective view schematically illustrating a stack structure of internal electrodes.

FIG. 2 is an exploded perspective view schematically illustrating a stack structure of internal electrodes.

Figure 3:
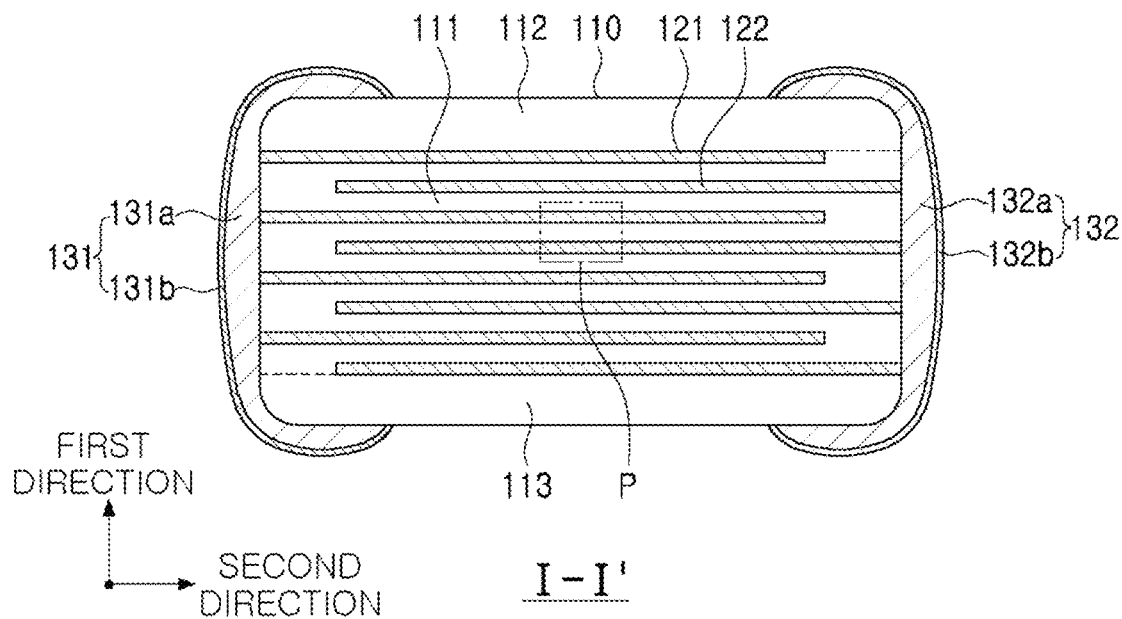
FIG. 3 is a cross-sectional view taken along line I-I' of FIG. 1.

FIG. 3 is a cross-sectional view taken along line I-I' of FIG. 1.

Figure 4:
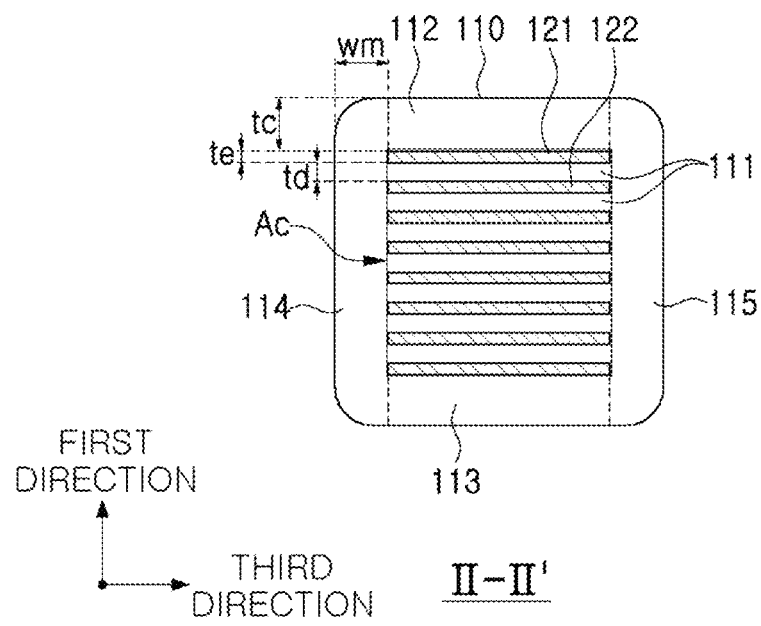
FIG. 4 is a cross-sectional view taken along line II-II' of FIG. 1.

FIG. 4 is a cross-sectional view taken along line II-II' of FIG. 1.

Figure 5:
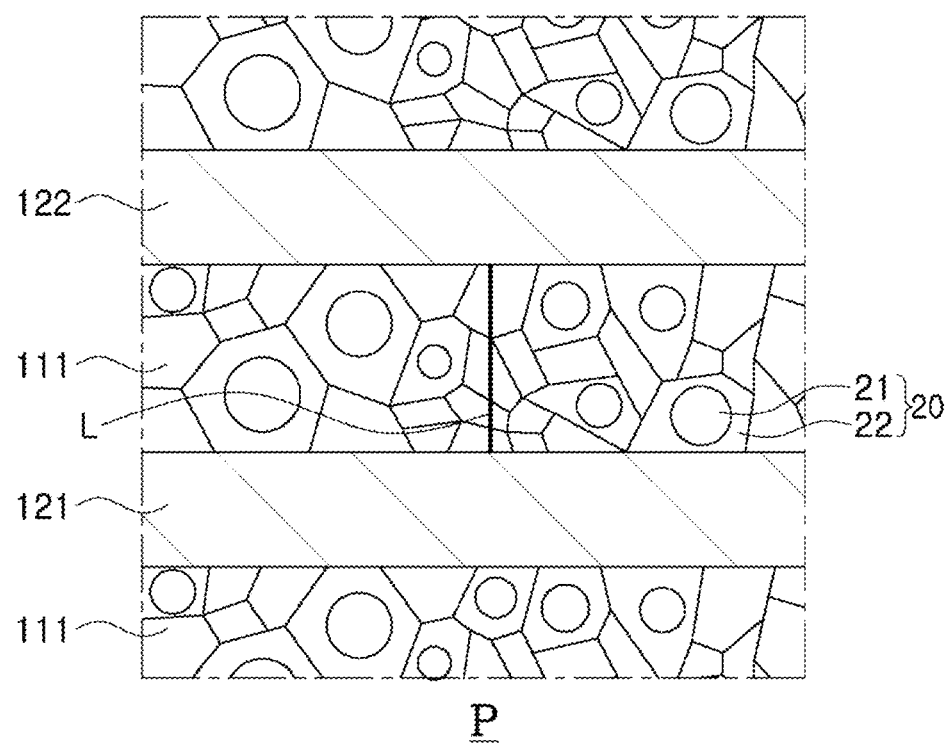
FIG. 5 is an enlarged view of region P of FIG. 3.

FIG. 5 is an enlarged view of region P of FIG. 3.

Hereinafter, a multilayer electronic component according to an exemplary embodiment in the present disclosure will be described in detail with reference to FIGS. 1 to 5. However, although a multilayer ceramic capacitor is described as an example of a multilayer electronic component, the present disclosure may also be applied to various electronic products using a dielectric composition, such as inductors, piezoelectric elements, varistors, or thermistors.

A multilayer electronic component 100 according to an exemplary embodiment in the present disclosure may include a body 110 including a dielectric layer 111 including a plurality of dielectric grains and internal electrodes 131 and 132 alternately disposed with the dielectric layer 111 in a first direction and external electrodes 131 and 132 disposed on the body 110, wherein at least one of the plurality of dielectric grains has a core-shell structure including an inner core 21 and a shell 22 covering at least a portion of the core 21, a ratio of an average size of the core 21 to an average size of the dielectric grains having the core-shell structure is 0.4 or more and 0.8 or less, a ratio ((Dy+Tb)/Sn) of the sum of the moles of dysprosium (Dy) and the moles of terbium (Tb) to the moles of tin (Sn) included in the dielectric layer satisfies 0.7 or more and 1.5 or less, and at least one of the dielectric layers 111 has four or more dielectric grains in the first direction.

In the body 110, the dielectric layers 111 and the internal electrodes 121 and 122 are alternately stacked.

More specifically, 110 may include a capacitance forming portion Ac disposed inside the body 110 and forming capacitance by including the first internal electrode 121 and the second internal electrode 122 alternately disposed to face each other with the dielectric layer 111 interposed therebetween.

Although the specific shape of the body 110 is not particularly limited, the body 110 may have a hexahedral shape or a shape similar thereto as illustrated. Due to the shrinkage of ceramic powder included in the body 110 during a sintering process, the body 110 may not have a perfectly straight hexahedral shape but may have a substantially hexahedral shape.

The body 110 may have first and second surfaces 1 and 2 facing each other in the first direction, third and fourth surfaces connected to the first and second surfaces 1 and 2 and facing each other in the second direction, and fifth and sixth surfaces 5 and 6 connected to the first to fourth surfaces 1, 2, 3, and 4 and facing each other in the third direction.

The dielectric layer 111 included in the body 110 is in a fired state, and adjacent dielectric layers 110 may be integrated such that boundaries therebetween may not be readily apparent without using a scanning electron microscope (SEM).

A raw material for forming the dielectric layer 110 is not limited as long as sufficient capacitance may be obtained. In general, a perovskite ($ABO_3$)-based material may be used, and for example, a barium titanate-based material, a lead composite perovskite-based material, or a strontium titanate-based material may be used. The barium titanate-based material may include $BaTiO_3$-based ceramic powder, and examples of the ceramic powder may include $BaTiO_3$ and $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$), or $Ba(Ti_{1-y}Zr_y)O_3$ ($0<y<1$) in which Ca, Zr, etc. are partially dissolved in $BaTiO_3$.

In addition, as a material for forming the dielectric layer 111, various ceramic additives, organic solvents, binders, dispersants, etc. may be added to powder of barium titanate ($BaTiO_3$) according to purposes of the present disclosure.

Meanwhile, in the case of recently developed microproducts, a thin-layer design application has reached the limit, and it is required to maximize additional characteristics of products under the condition of a minimum design thickness to secure the basic reliability of the products. Therefore, research into design changes from a materials point of view has been actively conducted. In the related art, characteristics of products are intended to be stabilized using ultra-fine base material in thin-layer design models, but it may be difficult to control a grain growth rate and processes causing particles to over-grow have been applied to attain high permittivity.

Therefore, in order to solve the above problems, it is necessary to improve dielectric properties of dielectrics and increase effective permittivity (decrease in permittivity reduction) that may be realized under a constant voltage application condition and it is necessary to improve characteristics of a core without a lattice having a large contribution to the improvement of permittivity in dielectric materials.

Therefore, in an exemplary embodiment in the present disclosure, in order to maximize the dielectric properties, as a base material including dielectric particles before firing, an assembled base material, rather than fine particles, in terms of size of the base material, is used and is designed to have an optimal composition to control various firing conditions or process conditions to improve the properties of a core of a dielectric material.

More specifically, $BaTiO_3$-based dielectrics generally have a tetragonal structure at room temperature, but in a region in which some elements, such as additives, are substituted, for example, a shell region, the tetragonal structure may be changed into a lattice structure of a cubic structure, and by changing into the lattice structure in this manner, the shell region may be converted into a phase with a dipole moment.

In general, a size of the core region observed in dielectric grains after firing is determined by a size of a dielectric particle base material before firing, and the size of the core is rarely affected during the firing or grain growth of the dielectric particles. Therefore, the size and grain growth rate of the dielectric particle base material before firing may be predicted by the core size of the dielectric grains after firing.

Meanwhile, it is known that an effective capacitance of a dielectric is improved when the size of a region having a tetragonal structure is larger than the size of a region having a cubic structure in the dielectric grains. In other words, permittivity may be improved as the ratio of cubic structure size to tetragonal structure size (tetragonal structure size/cubic structure size) in the dielectric grains having the same size increases.

In addition, the shell region in which some elements, such as additives, are substituted may have, in a lattice size unit, a domain wall in which defects occur in a lattice due to ionic defects, such as oxygen vacancies or defect dipoles in units of the lattice size, and these defect lattices cause irreversible domain wall motion when an electric field is applied, thereby reducing effective capacitance that may be implemented when voltage is applied. That is, when the size of the core increases relative to the size of the dielectric grains, the effective capacitance may be improved when a DC-bias voltage is applied.

Therefore, in the present disclosure, in order to maximize the effective capacitance when voltage is applied, an assembly base material is used to improve the size ratio of the core in the dielectric grains, a composition system that may be controlled to minimize a grain growth rate may be applied and a composition minimizing a lattice defect concentration to minimize loss of permittivity due to an irreversible domain wall motion may be designed to implement an effect of securing effective capacitance and improving a reduction rate of permittivity.

In an exemplary embodiment in the present disclosure, the dielectric layer 111 may include at least one dielectric layer in which four or more dielectric grains exist in the first direction, and the ratio (RE/Sn) of the number of moles of rare earth elements (RE) relative to the number of moles of tin (Sn) included in the dielectric layer 111 may satisfy 0.7 or more and 1.5 or less, wherein the rare earth elements (RE) may include dysprosium (Dy) and terbium (Tb).

The dielectric grain may include a plurality of dielectric grains, and at least one of the plurality of dielectric grains 20 may have a core-shell structure including an inner core 21 and a shell 22 covering at least a portion of the core 21.

The criterion for distinguishing between the core 21 and the shell 22 may be performed through scanning electron microscopy-energy dispersive X-ray spectroscopy (SEM-EDS) or transmission electron microscopy-energy dispersive X-ray spectroscopy (TEM-EDS) analysis. Other methods and/or tools appreciated by one of ordinary skill in the art, even if not described in the present disclosure, may also be used. The core 21 and the shell 22 may be divided based on the content of rare earth elements included in the dielectric grains of the core-shell structure. For example, in the case of dysprosium (Dy), a type of rare earth element, it is difficult to diffuse into the core, so during EDS analysis of dielectric grains, a circular region in which Dy is not diffused may be defined as the core, and a region covering or surrounding the core may be defined as a shell. In other words, the region from the core to the dielectric grain may be defined as a shell.

More preferably, in one dielectric grain having a core-shell structure, when analyzed using a line-profile, based on a point at which the Dy content rapidly changes, a region in which the Dy content is low may be defined as a core and a region in which the Dy content is high may be defined as a shell.

In addition, the dielectric layer 111 may include four or more dielectric grains in the first direction, and an upper limit of the dielectric grains is not particularly limited, but preferably, the dielectric layer 111 may include seven or less dielectric grains.

That is, there may be at least one dielectric layer 111 in which four or more and seven or less dielectric grains exist in the first direction.

Here, four or more dielectric grains existing in the first direction may not only refer to dielectric grains having a core-shell structure and may also include dielectric grains without a core-shell structure.

More specifically, referring to FIG. 5, in an exemplary embodiment in the present disclosure, the dielectric layer 111 may include a plurality of dielectric layers 111, may include at least one dielectric layer 111 in which, when a straight line L is drawn in the first direction in a certain dielectric layer 111 including dielectric grains, among the plurality of dielectric layers, four or more dielectric grains exist on the straight line L, and more preferably, may include at least one dielectric layer 111 in which four or more and seven or less dielectric grains exist on the straight line L.

Here, the straight line L may refer to a straight line L drawn in the first direction within a certain dielectric layer 111, and more specifically, may refer to a straight line L drawn in a direction substantially perpendicular to the first internal electrode 121 and the second internal electrode 122 adjacent thereto, and the number of dielectric grains present on the straight line L may be 4 or more.

A method of counting the dielectric grains existing on the straight line L may be counting dielectric grains penetrated by the straight line L or counting dielectric grains in which the straight line L penetrates through a grain boundary surrounding the dielectric grain, as the number of dielectrics existing on the straight line L, but is not limited thereto.

The ratio ((Dy+Tb)/Sn) of the sum of the moles of dysprosium (Dy) and the moles of terbium (Tb) to the moles of tin (Sn) included in the dielectric layer 111 may satisfy 0.7 or more and 1.5 or less.

When the ratio ((Dy+Tb)/Sn) of the sum of the moles of dysprosium (Dy) and the moles of terbium (Tb) to the moles of tin (Sn) included in the dielectric layer 111 may satisfy 0.7 or more and 1.5 or less, the effective capacitance may be improved and the grain growth of the dielectric particles may be more easily controlled to improve a reduction rate of the effective capacitance when voltage is applied.

If ratio ((Dy+Tb)/Sn) of the sum of the moles of dysprosium (Dy) and the moles of terbium (Tb) to the moles of tin (Sn) included in the dielectric layer 111 is less than 0.7 or greater than 1.5, the improvement of the capacitance reduction rate may be insufficient.

The dielectric layer 111 may include tin (Sn), and the number of moles of tin (Sn) relative to 100 moles of titanium (Ti) included in the dielectric layer 111 may be 1.0 mole or more and 2.0 mole or less.

When the number of moles of tin (Sn) relative to 100 moles of titanium (Ti) included in the dielectric layer 111 is 1.0 mole or more and 2.0 moles or less, the grain growth of dielectric particles may be more easily controlled and the effective capacitance may be improved.

If the number of moles of tin (Sn) is less than 1.0 mole, it may not be easy to control grain growth of dielectric particles, so the size of dielectric grains may increase and the number of grain boundaries may decrease, and the characteristics of a core without lattice point defects may weaken to degrade an effective rate due to electric field concentration. If the number of moles of tin (Sn) exceeds 2.0 moles, grain growth of dielectric particles may be easily controlled but it may be difficult to implement a high permittivity due to excessive grain growth suppression.

The dielectric layer 111 may include rare earth elements (RE), and the number of moles of the rare earth element (RE) relative to 100 moles of titanium (Ti) included in the dielectric layer 111 may be 1.1 moles or more and 2.25 moles or less.

The rare earth elements (RE) may include one or more of yttrium (Y), dysprosium (Dy), holmium (Ho), erbium (Er), gadolinium (Gd), cerium (Ce), neodymium (Nd), samarium (Sm), terbium (Tb), thulium (Tm), lanthanum (La), and ytterbium (Yb).

When two or more types of rare earth elements (RE) are added, the number of moles of the rare earth elements (RE) may refer to the number of moles of the sum of the added rare earth elements.

Any rare earth element capable of controlling the grain growth of dielectric particles may be used, and preferably, dysprosium (Dy) and terbium (Tb) may be used.

In other words, the sum of the moles of dysprosium (Dy) and the moles of terbium (Tb) relative to 100 moles of titanium (Ti) included in the dielectric layer 111 may be 1.1 moles or more and 2.25 moles or less.

When the sum of the moles of dysprosium (Dy) and the moles of terbium (Tb) relative to 100 moles of titanium (Ti) included in the dielectric layer 111 is 1.1 moles or more and 2.25 moles or less, the grain growth of dielectric particles may be more easily controlled, and the effective capacitance may be improved.

If the sum of the moles of dysprosium (Dy) and the moles of terbium (Tb) is less than 1.1 moles or greater than 2.25 moles relative to 100 moles of titanium (Ti) included in the dielectric layer 111, it may not be easy to control the grain growth of dielectric particles, and thus, the size of the dielectric grains may increase and the number of grain boundaries may decrease, so that the effective rate may be lowered or the dielectric grains may not be formed due to an electric field concentration. In addition, as the solid solution content of rare earth elements included in the shell region in the dielectric grains having the core-shell structure, which will be described later, decreases, it may not be easy to control oxygen defects, which may cause a problem in that reliability is greatly deteriorated.

In this case, the number of moles of dysprosium (Dy) relative to 100 moles of titanium (Ti) included in the dielectric layer 111 may be 0.7 moles or more and 1.5 moles or less.

When the number of moles of dysprosium (Dy) relative to 100 moles of titanium (Ti) included in the dielectric layer 111 is 0.7 moles or more and 1.5 moles or less, the grain growth of dielectric particles may be easily controlled and the effective capacitance may be improved.

If the number of moles of dysprosium (Dy) included in the dielectric layer 111 relative to 100 moles of titanium (Ti) is less than 0.7 moles, oxygen defects may not be sufficiently controlled and reliability may deteriorate due to occurrence of oxygen vacancies. If the number of moles of dysprosium (Dy) exceeds 1.5 moles, reliability may be improved but a firing temperature may be greatly increased or dielectric grains may not be formed.

In addition, the number of moles of terbium (Tb) included in the dielectric layer 111 relative to 100 moles of titanium (Ti) may be 0.2 moles or more and 1.55 moles or less.

When the number of moles of terbium (Tb) relative to 100 moles of titanium (Ti) included in the dielectric layer 111 is 0.2 moles or more and 1.55 moles or less, the grain growth of dielectric particles may be easily controlled and the effective capacitance may be improved.

If the number of moles of terbium (Tb) included in the dielectric layer 111 relative to 100 moles of titanium (Ti) is less than 0.2 moles, high-temperature withstand voltage characteristics may be inferior. If the number of moles of terbium (Tb) exceeds 1.55 moles, the effective rate may decrease.

The number of moles for the elements described herein may be obtained through scanning electron microscopy-energy dispersive X-ray spectroscopy (SEM-EDS) or transmission electron microscopy-energy dispersive X-ray spectroscopy (TEM-EDS) analysis. Other methods and/or tools appreciated by one of ordinary skill in the art, even if not described in the present disclosure, may also be used.

In an exemplary embodiment in the present disclosure, an average size of the dielectric grains included in the dielectric layer 111 may be 100 nm or more and 300 nm or less, more preferably, 130 nm or more and 230 nm or less.

The size of the dielectric grains may be an average of sizes of minimum straight lines and sizes of maximum straight lines passing through the center point of the dielectric grains, and the average size of the dielectric grains may be the average value of the sizes of a plurality of dielectric grains calculated in the manner as described above.

In other words, the size of a dielectric grain may refer to the average size of one dielectric grain, and the average size of a dielectric grain may refer to the average size of a plurality of dielectric grains included in the dielectric layer.

Here, the average size of the dielectric grains may be a value obtained by measuring sizes of dielectric grains observed in an image captured using a SEM or a TEM within a range of 1 μm×1 μm in the capacitance forming portion Ac including the dielectric layer and averaging the measured sizes. However, the present disclosure is not particularly limited thereto and the average size of the dielectric grains may be an average value of sizes of a plurality of dielectric grains included in one dielectric layer or may be an average value of sizes of a plurality of dielectric grains included in the capacitance forming portion Ac.

In this case, a standard deviation of the dielectric grain size relative to the average dielectric grain size may be ±100 nm or less, more preferably, ±50 nm or less.

For example, when the standard deviation of the size is ±50 nm or less and the average size of a plurality of dielectric grains is 180 nm, it may mean that a minimum size of the dielectric grains is 130 nm, a maximum size is 180 nm, and the size of the dielectric grains are within a minimum/maximum range.

When the standard deviation of the dielectric grain size satisfies ±100 nm or less, dielectric grains having a uniform size may be formed and reliability control may be more easily performed.

Meanwhile, in the dielectric grain 20 having the core 21-shell 22 structure, an average size of the core relative to the average size of the dielectric grains may be 0.4 or more and 0.8 or less, and may be 40% or more and 80% or less when expressed as a percentage.

Here, the average size of dielectric grains may be an average value of the sizes of dielectric grains having a core-shell structure. The size of the core may refer to a value obtained by averaging sizes of minimum straight lines and sizes of maximum straight lines passing through the center point of the core, and an average size of the core may be an average value of the sizes of a plurality of cores calculated in the above manner.

A straight line for calculating the size of a dielectric grain and a straight line for calculating the size of a core may be different.

When the average size of the core relative to the average size of the dielectric grains satisfies 0.4 or more and 0.8 or less, the effective capacitance may be improved and a reduction of the effective capacitance when voltage is applied may be improved.

In an exemplary embodiment in the present disclosure, the average size of the core 21 may be 50 nm or more and 200 nm or less, more preferably, 80 nm or more and 140 nm or less.

When the average size of the core 21 satisfies 50 nm or more and 200 nm or less, high dielectric properties may be exhibited, and in particular, when the average size of dielectric grains is as small as 300 nm or less, high dielectric properties may be more easily implemented.

If the average size of the core 21 is less than 50 nm, it may be difficult to achieve the intended dielectric properties, and if the average size of the core 21 exceeds 200 nm, the size of the dielectric grains may increase, resulting in deterioration of DC-bias characteristics or reliability.

A standard deviation of the core size relative to the average size of the core 21 may be ±75 nm or less, more preferably, ±30 nm or less.

For example, when the standard deviation of the size is ±30 nm or less and the average size of a plurality of cores is 110 nm, it may be mean that a minimum size of the cores is 80 nm, a maximum size is 140 nm, and the size of the cores is within the minimum/maximum range.

When the standard deviation of the size of the core 21 satisfies ±75 nm or less, cores having a uniform size may be formed and a capacitance reduction rate when voltage is applied may be improved, while securing high dielectric characteristics. In addition, it may be inferred that an assembly base material having a uniform size has been applied.

The average size of the core may be a value obtained by measuring sizes of cores observed in an image captured using a SEM or a TEM within a range of 1 μm×1 μm in the capacitance forming portion Ac including the dielectric layer and averaging the measured sizes. Other methods and/or tools appreciated by one of ordinary skill in the art, even if not described in the present disclosure, may also be used.

Figure 6:
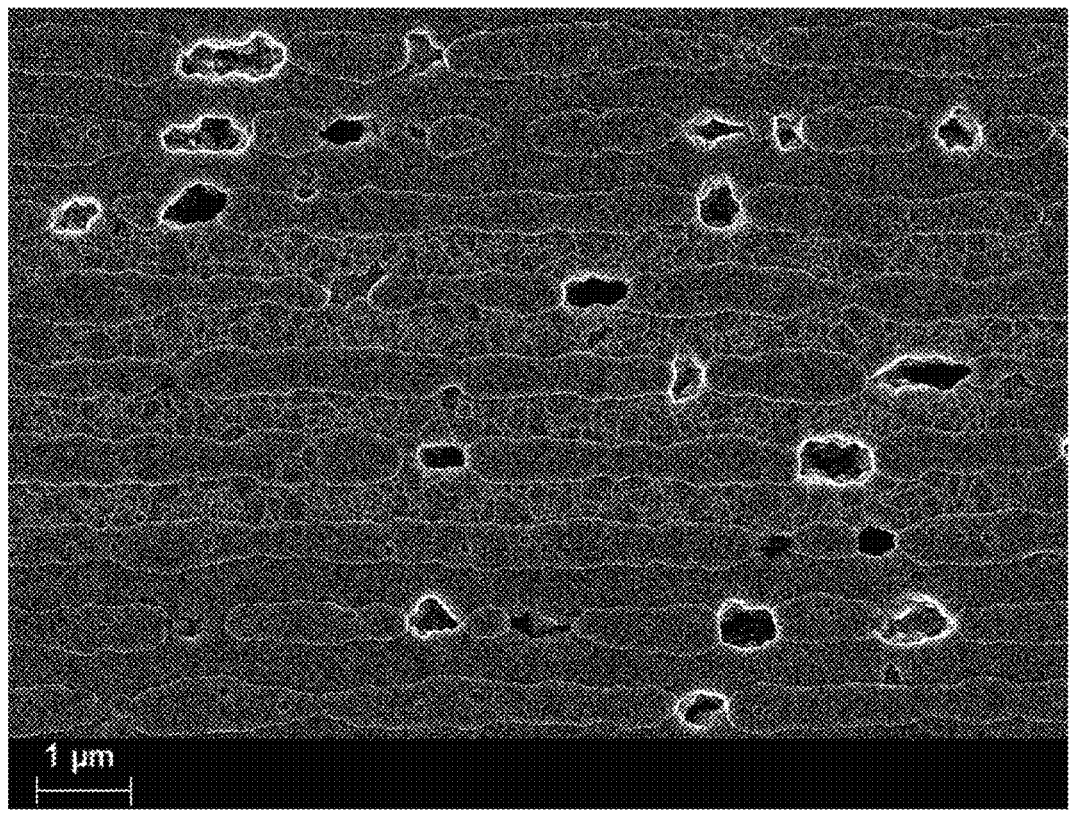
FIG. 6 is an image of a capacitance forming portion Ac according to an exemplary embodiment in the present disclosure captured by a scanning electron microscope (SEM).

FIG. 6 is an image of the capacitance forming portion Ac of an exemplary embodiment in the present disclosure, captured by a scanning electron microscope (SEM).

More specifically, FIG. 6 is a state in which an appropriate level of grain growth and density is achieved by applying the assembly base material, in which it may be identified that grains having various sizes are observed. That is it can be confirmed that the grains exist in a variety of sizes, from a level including one dielectric grain per dielectric layer found in the case of using a fine base material to a level including four or more dielectric grains per dielectric layer found in the case of non-particle growth of a fine base material.

A thickness td of the dielectric layer 111 may not be particularly limited.

However, in order to more easily achieve miniaturization and high capacitance of the multilayer electronic component, the thickness of the dielectric layer 111 may be 0.6 μm or less, more preferably, 0.4 μm or less.

Here, the thickness td of the dielectric layer 111 may refer to the thickness td of the dielectric layer 111 disposed between the first and second internal electrodes 121 and 122.

Meanwhile, the thickness td of the dielectric layer 111 may refer to a size of the dielectric layer 111 in the first direction. Also, the thickness td of the dielectric layer 111 may refer to an average thickness td of the dielectric layer 111 and may refer to an average size of the dielectric layer 111 in the first direction.

The average size of the dielectric layer 111 in the first direction may be measured by scanning an image of a cross-section of the body 110 in the first and second directions with a scanning electron microscope (SEM) having a magnification of 10,000. More specifically, the average size may be an average value obtained by measuring the sizes of one dielectric layer in the first direction at 30 equally spaced points in the second direction in the scanned image. The 30 points at equal intervals may be designated in the capacitance forming portion Ac. In addition, if the average value is measured by extending the measurement of the average value to 10 dielectric layers, the average size of the dielectric layers in the first direction may be more generalized. Other methods and/or tools appreciated by one of ordinary skill in the art, even if not described in the present disclosure, may also be used.

The internal electrodes 121 and 122 may be alternately stacked with the dielectric layer 111.

The internal electrodes 121 and 122 may include a first internal electrode 121 and a second internal electrode 122, and the first and second internal electrodes 121 and 122 may be alternately disposed to face each other with the dielectric layer 111 constituting the body 110 interposed therebetween, and may be exposed to the third and fourth surfaces 3 and 4 of the body 110, respectively.

More specifically, the first internal electrode 121 may be spaced apart from the fourth surface 4 and exposed through the third surface 3, and the second internal electrode 122 may be spaced apart from the third surface 3 and may be exposed through the fourth surface 4. The first external electrode 131 may be disposed on the third surface 3 of the body 110 and connected to the first internal electrode 121, and the second external electrode 131 may be disposed on the fourth surface 4 of the body 110 and may be connected to the second internal electrode 122.

That is, the first internal electrode 121 may not be connected to the second external electrode 132 but be connected to the first external electrode 131, and the second internal electrode 122 may not be connected to the first external electrode 131 but be connected to the second external electrode 132. In this case, the first and second internal electrodes 121 and 122 may be electrically separated from each other by the dielectric layer 111 disposed therebetween.

Meanwhile, the body 110 may be formed by alternately stacking a ceramic green sheet on which the first internal electrode 121 is printed and a ceramic green sheet on which the second internal electrode 122 is printed and subsequently sintering the green sheets.

A material for forming the internal electrodes 121 and 122 is not particularly limited, and a material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for internal electrodes including at least one of nickel (Ni), copper (Cu), palladium (Pd), silver (Ag), gold (Au), platinum (Pt), tin (Sn), tungsten (W), titanium (Ti), and alloys thereof on a ceramic green sheet. A printing method of the conductive paste for internal electrodes may be a screen-printing method or a gravure printing method, but the present disclosure is not limited thereto.

Meanwhile, a thickness te of the internal electrodes 121 and 122 may not be particularly limited.

However, in order to more easily achieve miniaturization and high capacitance of the multilayer electronic component, the thickness of the internal electrodes 121 and 122 may be 0.6 μm or less, more preferably, 0.4 μm or less.

Here, the thickness te of the internal electrodes 121 and 122 may refer to a size of the internal electrodes 121 and 122 in the first direction. In addition, the thickness te of the internal electrodes 121 and 122 may refer to an average thickness te of the internal electrodes 121 and 122, and may refer to an average size of the internal electrodes 121 and 122 in the first direction.

The average size of the internal electrodes 121 and 122 in the first direction may be measured by scanning an image of a cross-section of the body 110 in the first and second directions with a scanning electron microscope (SEM) having a magnification of 10,000. More specifically, the average size may be an average value obtained by measuring the sizes of one internal electrode 121 or 122 in the first direction at 30 equally spaced points in the second direction in the scanned image. The 30 equally spaced points may be designated in the capacitance forming unit Ac. In addition, when the average value is measured by extending the average value measurement to 10 internal electrodes 121 and 122, the average size of the internal electrodes 121 and 122 in the first direction may be more generalized. Other methods and/or tools appreciated by one of ordinary skill in the art, even if not described in the present disclosure, may also be used.

Meanwhile, the body 110 may include cover portions 112 and 113 disposed on both end surfaces of the capacitance forming portion Ac in the first direction.

More specifically, the body 110 may include an upper cover portion 112 disposed above the capacitance forming portion Ac in the first direction and a lower cover portion 113 disposed below the capacitance forming portion Ac in the first direction.

The upper cover portion 112 and the lower cover portion 113 may be formed by stacking a single dielectric layer 111 or two or more dielectric layers 111 on the upper and lower surfaces of the capacitance forming portion Ac in the first direction, respectively, and may serve to prevent damage to the internal electrodes 121 and 122 due to physical or chemical stress.

The upper cover portion 112 and the lower cover portion 113 may not include the internal electrodes 121 and 122 and may include the same material as that of the dielectric layer 111. That is, the upper cover portion 112 and the lower cover portion 113 may include a ceramic material, for example, a barium titanate ($BaTiO_3$)-based ceramic material.

Meanwhile, the thickness tc of the cover portions 112 and 113 may not be particularly limited.

However, in order more easily achieve miniaturization and high capacitance of the multilayer electronic component, a thickness tc of the cover portions 112 and 113 may be 100 µm or less, preferably, 30 µm or less, 20 µm or less in micro-miniature and more preferably, products.

Here, the thickness tc of the cover portions 112 and 113 may refer to a size of the cover portions 112 and 113 in the first direction. In addition, the thickness tc of the cover portions 112 and 113 may refer to an average thickness tc of the cover portions 112 and 113, and may refer to an average size of the cover portions 112 and 113 in the first direction.

The average size of the cover portions 112 and 113 in the first direction may be measured by scanning an image of a cross-section of the body 110 in the first and second directions with a scanning electron microscope (SEM) having a magnification of 10,000. More specifically, the average size may be an average value obtained by measuring the thickness of one cover portion at 30 equally spaced points in the second direction in the scanned image. The 30 equally spaced points may be designated on the upper cover portion 112. Other methods and/or tools appreciated by one of ordinary skill in the art, even if not described in the present disclosure, may also be used.

Meanwhile, side margin portions 114 and 115 may be disposed on both end surfaces of the body 110 in the third direction.

More specifically, the side margin portions 114 and 115 may include a first side margin portion 114 disposed on the fifth surface 5 of the body 110 and a second side margin portion 115 disposed on the sixth surface 6 of the body 110. That is, the side margin portions 114 and 115 may be disposed on both end surfaces of the body 110 in the third direction.

As illustrated, the side margin portions 114 and 115 may refer to a region between both ends of the first and second internal electrodes 121 and 122 in the third direction and a boundary surface of the body 110 based on the cross-section of the body 110 in the first and third directions.

The side margin portions 114 and 115 may basically serve to prevent damage to the internal electrodes 121 and 122 due to physical or chemical stress.

The side margin portions 114 and 115 may be formed by forming the internal electrodes 121 and 122 by applying conductive paste on the ceramic green sheet, except for a region in which the side margin portions 114 and 115 are to be formed, cutting so that the internal electrodes 121 and 122 are exposed to the fifth and sixth surfaces 5 and 6 of the body 110 after stacking to suppress a step difference due to the internal electrodes 121 and 122, and then stacking a single dielectric layer 111 or two or more dielectric layers 111 in the third direction on both end surfaces of the capacitance forming portion Ac in the third direction.

The first side margin portion 114 and the second side margin portion 115 may not include the internal electrodes 121 and 122 and may include the same material as that of the dielectric layer 111. That is, the first side margin portion 114 and the second side margin portion 115 may include a ceramic material, for example, a barium titanate ($BaTiO_3$)-based ceramic material.

Meanwhile, a width wm of the first and second side margin portions 114 and 115 may not be particularly limited.

However, in order to more easily achieve miniaturization and high capacitance of the multilayer electronic component 100, the width wm of the first and second side margin portions 114 and 115 may be 100 µm or less, preferably, 30 µm or less, and more preferably, 20 µm or less in ultra-small products.

Here, the width wm of the side margin portions 114 and 115 may refer to a size of the side margin portions 114 and 115 in the third direction. Also, the width wm of the side margin portions 114 and 115 may refer to an average width wm of the side margin portions 114 and 115, and may refer to an average size of the side margin portions 114 and 115 in the third direction.

The average size of the side margins 114 and 115 in the third direction may be measured by scanning an image of a cross-section of the body 110 in the first and third directions with a scanning electron microscope (SEM) having a magnification of 10,000. More specifically, the average size may be an average value obtained by measuring the sizes of one side margin portion in the third direction at 30 equally spaced points in the first direction in the scanned image. The 30 equally spaced points may be designated in the first side margin portion 114. Other methods and/or tools appreciated by one of ordinary skill in the art, even if not described in the present disclosure, may also be used.

Although a structure in which the ceramic electronic component 100 includes two external electrodes 131 and 132 is described in an exemplary embodiment in the present disclosure, the number and shape of the external electrodes 131 and 132 may vary according to the shape of the internal electrodes 121 and 122 or other purposes.

The external electrodes 131 and 132 may be disposed on the body 110 and connected to the internal electrodes 121 and 122.

More specifically, the external electrodes 131 and 132 may be include first and second external electrodes 131 and 132 disposed on the third and fourth surfaces 3 and 4 of the body 110, respectively, and connected to the first and second internal electrodes 121 and 122, respectively. That is, the first external electrode 131 may be disposed on the third surface 3 of the body and connected to the first internal electrode 121, and the second external electrode 132 may be disposed on the fourth surface 4 of the body and may be connected to the second internal electrode 122.

The external electrodes 131 and 132 may be formed using any material having electrical conductivity, such as metal, and a specific material may be determined in consideration of electrical characteristics, structural stability, and the like, or may have a multilayer structure.

For example, the external electrodes 131 and 132 may include electrode layers 131a and 132a disposed on the body 110 and plating layers 131b and 132b disposed on the electrode layers 131a and 132a.

As a more specific example of the electrode layers 131a and 132a, the electrode layers 131a and 132a may be fired electrodes formed of conductive metal and glass or resin-based electrodes formed of conductive metal and resin.

In addition, the electrode layers 131a and 132a may have a form in which a plastic electrode and a resin-based electrode are sequentially formed on the body 110.

In addition, the electrode layers 131a and 132a may be formed by transferring a sheet including a conductive metal onto the body 110 or by transferring a sheet including a conductive metal onto a fired electrode.

The conductive metal used in the electrode layers 131a and 132a is not particularly limited as long as it is a material that may be electrically connected to the internal electrodes 121 and 122 to form capacitance, and examples thereof may include one or more selected from the group consisting of nickel (Ni) and copper (Cu), palladium (Pd), silver (Ag), gold (Au), platinum (Pt), tin (Sn), tungsten (W), titanium (Ti), and alloys thereof. The electrode layers 131a and 132a may be formed by applying a conductive paste prepared by adding glass frit to the conductive metal powder and then firing it.

The plating layers 131b and 132b serve to improve mounting characteristics.

The type of the plating layers 131b and 132b is not particularly limited, and may be a single plating layer 131b or 132b including at least one of nickel (Ni), tin (Sn), palladium (Pd), and alloys thereof, or may be formed of a plurality of layers.

For a more specific example of the plating layers 131b and 132b, the plating layers 131b and 132b may be Ni plating layers or Sn plating layers, and may have a form in which a Ni plating layer and an Sn plating layer are sequentially formed on the electrode layers 131a and 132a or may have a form in which a Sn plating layer, a Ni plating layer, and a Sn plating layer are sequentially formed. In addition, the plating layers 131b and 132b may include a plurality of Ni plating layers and/or a plurality of Sn plating layers.

Meanwhile, a size of the multilayer electronic component 100 may not be particularly limited.

However, the effect of the present disclosure may be more effective in a micro-product, and for example, in the case of a multilayer electronic component having a size of 1005 (length×width, 1.0 mm×0.5 mm) or less, the effect of the present disclosure may be better.

Although the exemplary embodiments of the present disclosure have been described in detail above, the present disclosure is not limited by the exemplary embodiments described above and the accompanying drawings, and is intended to be limited by the appended claims. Therefore, various forms of substitution, modification, and change may be possible by those skilled in the art within the scope of the technical spirit of the present disclosure described in the claims, which also falls within the scope of the present disclosure.

Hereinafter, the present disclosure will be described in more detail through test examples, but this is to help a detailed understanding of the invention, and the scope of the present disclosure is not limited by the examples.

(Test Examples)

The sample chips in Tables 1 to 8 below were manufactured to have a chip size of 1005 (length×width: 1.0 mm×0.5 mm), and the average thickness of the dielectric layer was 0.6 μm or less.

The number of dielectric grains was obtained by counting the number of dielectric grains present on the straight line L when a straight line L was drawn in the first direction in the dielectric layer.

A size of the core was measured in a region in which dysprosium (Dy) was rarely detected, after mapping dysprosium (Dy) through TEM-EDS. As described above, an average value of sizes of a minimum straight line and a maximum straight line passing through the center point as described above was described as the size of the core.

Tin (Sn) and rare earth elements dysprosium (Dy) and terbium (Tb) were included in the dielectric layer, and the number of moles of tin (Sn) and the number of moles of dysprosium (Dy) and terbium (Tb) relative to 100 moles of titanium (Ti) were measured and described. In addition, the ratio ((Dy+Tb)/Sn) of the sum of the moles of dysprosium (Dy) and the moles of terbium (Tb) relative to the moles of tin (Sn) measured above was calculated and reflected in the tables.

In addition, the effective capacitance μF when voltage was applied to each sample chip was measured and reflected in the table, and a capacitance reduction rate (%), which is the ratio of the effective capacitance C value measured when voltage was applied, to a reference effective capacitance $C_0$, was calculated and reflected together. More specifically, the capacitance reduction rate (%) may refer to a difference value of effective capacitance when voltage is applied with respect to the reference effective capacitance, and may refer to a value of $\{(C_0-C)/co\} \times 100\%$.

0V is the effective capacitance μF when voltage is not applied and corresponds to the reference effective capacitance. The effective capacitance μF and capacitance reduction rate (%) when voltages of 1V and 3V were applied, respectively, were measured and calculated, and reflected in the tables.

At this time, the capacitance reduction rate was evaluated to be improved in a case in which the capacitance reduction rate was within 36% when the voltage of 1V was applied and a case in which the capacitance reduction rate was within 70% when the voltage of 3V was applied, relative to the reference effective capacitance, which cases are marked as "o" in the tables below. Meanwhile, a case in which either of the two capacitance reduction rates at the time of application of 1V and 3V was not satisfied was marked as "X".

TABLE 1

| Sample chip | Number of dielectric grains | Core (nm) | Sn (mol) | Dy (mol) | Tb (mol) | (Dy + Tb)/Sn |
|---|---|---|---|---|---|---|
| 1-1 | 1 | 30 | 1.5 | 0.9 | 0.6 | 1 |
| 1-2 | 1 | 30 | 1.2 | 0.9 | 0.3 | 1 |

TABLE 1-continued

| Sample chip | Number of dielectric grains | Core (nm) | Sn (mol) | Dy (mol) | Tb (mol) | (Dy + Tb)/Sn |
|---|---|---|---|---|---|---|
| 1-3 | 1 | 30 | 1 | 0.9 | 0.2 | 1.1 |
| 2-1 | 2 | 30 | 1 | 0.5 | 0.2 | 0.7 |
| 2-2 | 2 | 30 | 1 | 0.5 | 0.25 | 0.75 |
| 2-3 | 2 | 30 | 1 | 0.5 | 0.3 | 0.8 |
| 2-4 | 2 | 30 | 1 | 0.5 | 0.3 | 0.8 |
| 2-5 | 2 | 30 | 7 | 0.9 | 0.1 | 1 |
| 2-6 | 2 | 30 | 1.5 | 0.9 | 0.6 | 1 |
| 2-7 | 2 | 30 | 1.2 | 0.9 | 0.3 | 1 |
| 2-8 | 2 | 30 | 1 | 0.9 | 0.2 | 1.1 |
| 2-9 | 2 | 30 | 1 | 0.9 | 0.3 | 1.2 |
| 2-10 | 2 | 30 | 0.5 | 0.5 | 0.2 | 1.4 |
| 2-11 | 2 | 30 | 1 | 0.9 | 0.5 | 1.4 |
| 2-12 | 2 | 30 | 1 | 0.5 | 0.92 | 1.42 |
| 3-1 | 3 | 30 | 1.5 | 0.9 | 0.6 | 1 |
| 3-2 | 3 | 30 | 1.2 | 0.9 | 0.3 | 1 |
| 3-3 | 3 | 30 | 1 | 0.9 | 0.5 | 1.4 |
| 3-4 | 3 | 60 | 1 | 1 | 0 | 1 |

TABLE 2

| Sample chip | 0 V Effective capacitance | 1 V Effective capacitance | 1 V Capacitance reduction rate (AC@1 V) | 3 V Effective capacitance | 3 V Capacitance reduction rate (AC@3 V) | Evaluation |
|---|---|---|---|---|---|---|
| 1-1 | 2808.4 | 1730.2 | −38.4 | 845.4 | −69.9 | X |
| 1-2 | 3505.6 | 1845.1 | −47.4 | 807.2 | −77 | X |
| 1-3 | 3176.3 | 1841.9 | −42 | 793.8 | −75 | X |
| 2-1 | 2647.3 | 1424.5 | −46.2 | 739.2 | −72.1 | X |
| 2-2 | 2293.7 | 1314 | −42.7 | 815.1 | −64.5 | X |
| 2-3 | 2603.4 | 1582.8 | −39.2 | 789.9 | −69.7 | X |
| 2-4 | 3177.2 | 1493.1 | −53 | 726.6 | −77.1 | X |
| 2-5 | 2842.1 | 1539.2 | −45.8 | 728.1 | −74.4 | X |
| 2-6 | 2675.8 | 1685.3 | −37 | 882.9 | −67 | X |
| 2-7 | 3615.5 | 1815.2 | −49.8 | 787.4 | −78.2 | X |
| 2-8 | 3339.9 | 1861.8 | −44.3 | 789.8 | −76.4 | X |
| 2-9 | 3362.2 | 1548.2 | −54 | 655.8 | −80.5 | X |
| 2-10 | 2390.9 | 1356.6 | −43.3 | 739.9 | −69.1 | X |
| 2-11 | 2511.3 | 1231.4 | −51 | 647.9 | −74.2 | X |
| 2-12 | 2744.6 | 1427 | −48 | 731.4 | −73.4 | X |
| 3-1 | 2855.2 | 1781.2 | −37.6 | 851.5 | −70.2 | X |
| 3-2 | 4196.3 | 1777.3 | −57.6 | 812.5 | −80.6 | X |
| 3-3 | 2922.6 | 1288.6 | −55.9 | 659.3 | −77.4 | X |
| 3-4 | 2242.2 | 1342 | −40.1 | 882.4 | −60.6 | X |

Tables 1 and 2 correspond to cases in which the number of dielectric grains in the dielectric layer is 1 to 3. In addition, the size of the core corresponds to 30 nm or more and 60 nm or less. This means that grain growth was not controlled due to the large size of the dielectric grains, and it may be evaluated that the effective capacitance reduction rate was not improved when voltage was applied due to the large size of the shell.

TABLE 3

| Sample chip | Number of dielectric grains | Core (nm) | Sn (mol) | Dy (mol) | Tb (mol) | (Dy + Tb)/Sn |
|---|---|---|---|---|---|---|
| 4-1 | 4 | 30 | 1.5 | 0.9 | 0.6 | 1 |
| 4-2 | 4 | 30 | 1.2 | 0.9 | 0.3 | 1 |
| 4-3 | 4 | 30 | 1 | 0.9 | 0.5 | 1.4 |
| 4-4 | 4 | 60 | 1 | 1 | 0 | 1 |
| 4-5 | 4 | 60 | 1 | 1.2 | 0 | 1.2 |
| 4-6 | 4 | 80 | 1.5 | 0.9 | 0.6 | 1 |
| 4-7 | 4 | 80 | 1.5 | 0.9 | 0.9 | 1.2 |
| 4-8 | 4 | 80 | 1.5 | 0.8 | 1.3 | 1.4 |
| 4-9 | 4 | 80 | 1.5 | 0.7 | 1.55 | 1.5 |
| 4-10 | 4 | 90 | 1 | 0.5 | 0.15 | 0.65 |
| 4-11 | 4 | 90 | 2 | 1.3 | 0.2 | 0.75 |
| 4-12 | 4 | 90 | 1.5 | 0.9 | 0.4 | 0.87 |
| 4-13 | 4 | 90 | 1.5 | 0.9 | 0.45 | 0.9 |
| 4-14 | 4 | 90 | 1.5 | 1.2 | 0.3 | 1 |
| 4-15 | 4 | 90 | 1.5 | 0.8 | 0.85 | 1.1 |
| 4-16 | 4 | 90 | 1 | 0.9 | 0.6 | 1.5 |
| 4-17 | 4 | 100 | 2 | 1.3 | 0.2 | 0.75 |
| 4-18 | 4 | 100 | 1.5 | 0.9 | 0.4 | 0.87 |
| 4-19 | 4 | 100 | 1.5 | 0.9 | 0.9 | 1.2 |
| 4-20 | 4 | 100 | 1.5 | 0.9 | 1.2 | 1.4 |
| 4-21 | 4 | 100 | 1.5 | 0.9 | 1.35 | 1.5 |
| 4-22 | 4 | 110 | 2 | 1.3 | 0.2 | 0.75 |
| 4-23 | 4 | 110 | 1.5 | 0.9 | 0.4 | 0.87 |
| 4-24 | 4 | 120 | 1 | 0.7 | 0.5 | 1.2 |
| 4-25 | 4 | 120 | 1 | 0.9 | 0.5 | 1.4 |
| 4-26 | 4 | 120 | 1 | 0.9 | 0.6 | 1.5 |

TABLE 4

| Sample chip | 0 V Effective capacitance | 1 V Effective capacitance | 1 V Capacitance reduction rate (Ac@1 V) | 3 V Effective capacitance | 3 V Capacitance reduction rate (AC@3 V) | Evaluation |
|---|---|---|---|---|---|---|
| 4-1 | 2757.4 | 1567.2 | −43.2 | 878.8 | −68.1 | X |
| 4-2 | 3565.3 | 1741 | −51.2 | 814.7 | −77.2 | X |
| 4-3 | 2824.5 | 1241.5 | −56 | 664.9 | −76.5 | X |
| 4-4 | 2810.8 | 1759.1 | −37.4 | 850.7 | −69.7 | X |
| 4-5 | 2114.3 | 1284 | −39.3 | 866.4 | −59 | X |
| 4-6 | 3182.5 | 2057.5 | −35.4 | 958.4 | −69.9 | ○ |
| 4-7 | 3039.8 | 2009 | −33.9 | 965 | −68.3 | ○ |
| 4-8 | 2330.9 | 1895.1 | −18.7 | 1069.3 | −54.1 | ○ |
| 4-9 | 2399.3 | 1947 | −18.9 | 1078.4 | −55.1 | ○ |
| 4-10 | 3560 | 1849.1 | −48.1 | 662.8 | −64.2 | X |
| 4-11 | 2845.1 | 2043.9 | −28.2 | 1043.7 | −63.3 | ○ |
| 4-12 | 2308.2 | 1933 | −16.3 | 1027.1 | −55.5 | ○ |
| 4-13 | 2876.9 | 2039.3 | −29.1 | 1001.1 | −65.2 | ○ |
| 4-14 | 3007.7 | 2087.1 | −30.6 | 986.6 | −67.2 | ○ |
| 4-15 | 2914.8 | 2073.9 | −28.8 | 994.2 | −65.9 | ○ |
| 4-16 | 2481.2 | 1817.8 | −26.7 | 860.2 | −65.3 | ○ |
| 4-17 | 2766.9 | 1992 | −28 | 1013.5 | −63.4 | ○ |
| 4-18 | 2518.6 | 2021.2 | −19.7 | 1018.2 | −59.6 | ○ |
| 4-19 | 2415 | 1790.3 | −25.9 | 996.9 | −58.7 | ○ |
| 4-20 | 2419.8 | 1892.7 | −21.8 | 1030.2 | −57.4 | ○ |
| 4-21 | 2198 | 1936.7 | −11.9 | 1046.7 | −52.4 | ○ |
| 4-22 | 2811.7 | 1970.3 | −29.9 | 1001.1 | −64.4 | ○ |
| 4-23 | 2622.6 | 2061.9 | −21.4 | 1006 | −61.6 | ○ |
| 4-24 | 2498.7 | 2022.6 | −19.1 | 1095.5 | −56.2 | ○ |
| 4-25 | 2506.5 | 2041.6 | −18.5 | 1106.7 | −55.8 | ○ |
| 4-26 | 2409.2 | 2003.2 | −16.9 | 1109.9 | −53.9 | ○ |

Tables 3 and 4 correspond to the case in which the number of dielectric grains in the dielectric layer is 4. Meanwhile, it can be seen that, in the case of the sample chips 4-1 to 4-5 having a core size of 30 nm or more and 60 nm or less, the effective capacitance reduction rate when the voltage of 1V or 3V was applied was not improved. This may be estimated that the size of the core is small and the size of the shell is large, resulting in a large decrease in effective capacitance due to electric field concentration when voltage is applied.

Meanwhile, it can be seen that, in the case of sample chips 4-6 to 4-9 and sample chips 4-11 to 4-26 having a core size of 80 nm or more and 120 nm or less, the capacitance reduction rates were improved. In the case of sample chips 4-10, the core size corresponds to 90 nm, which is considered to have a sufficient core size, but the value of (Dy+Tb)/Sn corresponds to 0.65. This may be an indication that the rare-earth elements were relatively insufficient, and thus, grain growth was not sufficiently controlled, resulting in an enlarged shell area and an electric field concentration phenomenon to increase the extent to which the capacitance was reduced.

TABLE 5

| Sample chip | Number of dielectric grains | Core (nm) | Sn (mol) | Dy (mol) | Tb (mol) | (Dy + Tb)/Sn |
|---|---|---|---|---|---|---|
| 5-1 | 5 | 80 | 2 | 0.9 | 0.5 | 0.7 |
| 5-2 | 5 | 80 | 2 | 1.2 | 0.4 | 0.8 |
| 5-3 | 5 | 80 | 1.5 | 1.2 | 0.75 | 1.3 |
| 5-4 | 5 | 80 | 1.5 | 1.5 | 0.6 | 1.4 |
| 5-5 | 5 | 80 | 1.5 | 1.5 | 0.75 | 1.5 |
| 5-6 | 5 | 90 | 1 | 0.9 | 0.2 | 1.1 |
| 5-7 | 5 | 90 | 1 | 0.9 | 0.3 | 1.2 |
| 5-8 | 5 | 90 | 1 | 0.9 | 0.4 | 1.3 |
| 5-9 | 5 | 90 | 1 | 0.9 | 0.6 | 1.5 |
| 5-10 | 5 | 90 | 1 | 0.5 | 1.12 | 1.62 |
| 5-11 | 5 | 100 | 1.5 | 1.2 | 0.3 | 1 |
| 5-12 | 5 | 100 | 1.5 | 1.2 | 0.6 | 1.2 |
| 5-13 | 5 | 100 | 1.5 | 1.2 | 0.9 | 1.4 |
| 5-14 | 5 | 100 | 1.5 | 1.8 | 0.45 | 1.5 |
| 5-15 | 5 | 110 | 1 | 0.9 | 0.5 | 1.4 |
| 5-16 | 5 | 120 | 1 | 0.9 | 0.3 | 1.2 |
| 5-17 | 5 | 120 | 1 | 0.9 | 0.5 | 1.4 |
| 5-18 | 5 | 120 | 1 | 0.9 | 0.6 | 1.5 |

TABLE 6

| Sample chip | 0 V Effective capacitance | 1 V Effective capacitance | 1 V Capacitance reduction rate (AC@1 V) | 3 V Effective capacitance | 3 V Capacitance reduction rate (AC@3 V) | Evaluation |
|---|---|---|---|---|---|---|
| 5-1 | 2368.9 | 1952.6 | −17.6 | 1076.5 | −54.6 | ○ |
| 5-2 | 2480.4 | 1961.3 | −20.9 | 1055.3 | −57.5 | ○ |
| 5-3 | 2447.5 | 1906.1 | −22.1 | 1030.5 | −57.9 | ○ |
| 5-4 | 2902.8 | 2084.9 | −28.2 | 1031.8 | −64.5 | ○ |
| 5-5 | 2871.2 | 2088.4 | −27.3 | 1038.7 | −63.8 | ○ |
| 5-6 | 2883.2 | 1966.7 | −31.8 | 912.7 | −68.3 | ○ |
| 5-7 | 2583.1 | 1925.9 | −25.4 | 954.4 | −63.1 | ○ |

TABLE 6-continued

| | 0 V | 1 V | | 3 V | | |
|---|---|---|---|---|---|---|
| Sample chip | Effective capacitance | Effective capacitance | Capacitance reduction rate (AC@1 V) | Effective capacitance | Capacitance reduction rate (AC@3 V) | Evaluation |
| 5-8 | 2488.7 | 1980.8 | −20.4 | 1078 | −56.7 | ○ |
| 5-9 | 2109.9 | 1764.1 | −16.4 | 1058 | −49.9 | ○ |
| 5-10 | 2842.4 | 1772.5 | −37.6 | 808.2 | −71.6 | X |
| 5-11 | 2579.6 | 2072.2 | −19.7 | 1124.8 | −56.4 | ○ |
| 5-12 | 2363.9 | 1950 | −17.5 | 1098.4 | −53.5 | ○ |
| 5-13 | 2482.3 | 1930.8 | −22.2 | 1030.4 | −58.5 | ○ |
| 5-14 | 2420.7 | 1897.5 | −21.6 | 1035.8 | −57.2 | ○ |
| 5-15 | 2853.4 | 2028 | −28.9 | 985.2 | −65.5 | ○ |
| 5-16 | 2425.2 | 1968.5 | −18.8 | 1073 | −55.8 | ○ |
| 5-17 | 2411.5 | 1986.1 | −17.6 | 1085.9 | −55 | ○ |
| 5-18 | 2343.4 | 1922.5 | −18 | 1078.1 | −54 | ○ |

Table 5 and Table 6 correspond to cases in which the number of dielectric grains in the dielectric layer is 5. Meanwhile, it can be seen that, in the case of sample chips 5-1 to 5-9 and sample chips 5-11 to 5-18 having a core size of 80 nm or more and 120 nm or less, the effective capacitance reduction rate when voltages of 1V and 3V were applied was improved.

Meanwhile, in the case of sample chip 5-10, the core size corresponds to 90 nm, which is considered to have a sufficient core size, but the value of (Dy+Tb)/Sn corresponds to 1.62. This may be an indication that a relatively large amount of rare-earth elements were added, and thus, grain growth was not sufficiently controlled, resulting in an enlarged shell area and an electric field concentration phenomenon to increase the extent to which the capacitance was reduced.

TABLE 7

| Sample chip | Number of dielectric grains | Core (nm) | Sn (mol) | Dy (mol) | Tb (mol) | (Dy + Tb)/Sn |
|---|---|---|---|---|---|---|
| 6-1 | 6 | 90 | 1 | 0.9 | 0.3 | 1.2 |
| 6-2 | 6 | 90 | 1 | 0.9 | 0.4 | 1.3 |
| 6-3 | 6 | 90 | 1 | 1.3 | 0.2 | 1.5 |
| 6-4 | 6 | 90 | 1 | 0.5 | 1.12 | 1.62 |
| 6-5 | 6 | 110 | 1 | 0.9 | 0.5 | 1.4 |
| 7-1 | 7 | 90 | 1 | 1.3 | 0.2 | 1.5 |
| 7-2 | 7 | 110 | 1 | 0.9 | 0.5 | 1.4 |

TABLE 8

| | 0 V | 1 V | | 3 V | | |
|---|---|---|---|---|---|---|
| Sample chip | Effective capacitance | Effective capacitance | Capacitance reduction rate (AC@1 V) | Effective capacitance | Capacitance reduction rate (AC@3 V) | Evaluation |
| 6-1 | 2725 | 1973.6 | −27.6 | 933 | −65.8 | ○ |
| 6-2 | 2293.2 | 1791.7 | −21.9 | 982.2 | −57.2 | ○ |
| 6-3 | 1963.1 | 1651.9 | −15.9 | 1005.7 | −48.8 | ○ |
| 6-4 | 3003.4 | 1702.3 | −43.3 | 761.2 | −74.7 | X |
| 6-5 | 2938 | 2030.4 | −30.9 | 969.8 | −67 | ○ |
| 7-1 | 2222.4 | 1885.9 | −15.1 | 1086.3 | −51.1 | ○ |
| 7-2 | 2906.8 | 1985 | −31.7 | 942.7 | −67.6 | ○ |

Tables 7 and 8 correspond to cases in which the number of dielectric grains in the dielectric layer is 6 and 7. Meanwhile, it can be seen that, in the case of sample chips 6-1 to 6-3 and sample chips 7-1 to 7-2 having a core size of 90 nm or more and 110 nm or less, the effective capacitance reduction rates when voltages of 1V and 3V were applied was improved.

Meanwhile, in the case of sample chip 6-4, the size of the core corresponds to 90 nm, which is considered to have a sufficient core size, but the value of (Dy+Tb)/Sn corresponds to 1.62. This may be an indication that a relatively large amount of rare-earth elements were added, and thus, grain growth was not sufficiently controlled, resulting in an enlarged shell area and an electric field concentration phenomenon to increase the extent to which the capacitance was reduced.

Table 9 below shows data obtained by measuring the sizes of dielectric grains having a core-shell structure and the core sizes of the measured dielectric grains.

More specifically, based on a cross-section in the first and second directions at ½ point in the third direction of the multilayer electronic component, the sizes of dielectric grains and cores present in an image having a size of 1 μm×1 μm including a dielectric layer between adjacent internal electrodes in the capacitance forming portion Ac were measured.

Here, dielectric grains in which the size of the dielectric grains was measured and dielectric grains in which the size of the core was measured are the same.

For the size measurement of dielectric grains, sizes of minimum straight lines and sizes of maximum straight lines passing through the center point of dielectric grains were measured, the average value of the sizes of the minimum straight lines and the sizes of the maximum straight lines was described as the size of dielectric grains, and the unit is nm.

For the size measurement of the core, sizes of minimum straight lines and sizes of maximum straight lines passing through the center point of core were measured, the average value of the sizes of the minimum straight lines and the sizes of the maximum straight lines was described as the size of core, and the unit is nm.

The core fraction (%) is expressed as a percentage of the core size relative to the size of the dielectric grains.

TABLE 9

| Dielectric grain sample | Dielectric grain (nm) | | | Core (nm) | | | Core fraction |
|---|---|---|---|---|---|---|---|
| | Minimum size | Maximum size | Size | Minimum size | Maximum size | Size | |
| G1 | 130.0 | 141.9 | 135.9 | 112.4 | 88.4 | 100.4 | 74% |
| G2 | 141.9 | 286.0 | 214.0 | 92.1 | 142.6 | 117.4 | 55% |
| G3 | 199.1 | 261.9 | 230.5 | 81.6 | 144.0 | 112.8 | 49% |
| G4 | 132.2 | 136.5 | 134.3 | 95.1 | 112.6 | 103.9 | 77% |
| G5 | 142.3 | 147.7 | 145.0 | 71.8 | 74.4 | 73.1 | 50% |
| G6 | 99.1 | 195.6 | 147.3 | 93.1 | 98.8 | 95.9 | 65% |
| G7 | 196.5 | 263.0 | 229.7 | 163.9 | 167.9 | 165.9 | 72% |
| G8 | 171.1 | 242.1 | 206.6 | 83.8 | 115.6 | 99.7 | 48% |
| G9 | 190.1 | 290.8 | 240.4 | 115.8 | 205.3 | 160.5 | 67% |
| G10 | 146.7 | 193.9 | 170.3 | 139.3 | 140.3 | 139.8 | 82% |
| G11 | 92.3 | 150.2 | 121.2 | 79.0 | 87.6 | 83.3 | 69% |
| G12 | 152.7 | 192.3 | 172.5 | 104.2 | 139.7 | 121.9 | 71% |
| G13 | 144.8 | 197.4 | 171.1 | 85.7 | 94.2 | 90.3 | 53% |
| Average | | | 178.4 | | | 112.7 | 64% |
| Standard deviation | | | 41.3 | | | 28.3 | |

Referring to Table 9, the average size of the dielectric grains of an exemplary embodiment in the present disclosure is 178.4 nm, the standard deviation corresponds to 41.3 nm, the average size of the core is 112.7 nm, and the standard deviation corresponds to 28.3 nm. At this time, the average of the core fraction corresponds to 64%.

This means that the size fraction of the core relative to the size of the dielectric grains is 64% on average, which means that the size of the core is relatively large. Based thereon, it may be estimated that the effective capacitance reduction rate due to the electric field concentration phenomenon will be improved, while the value of the effective capacitance is large.

One of the various effects of the present disclosure is to provide the multilayer electronic component having improved permittivity by improving a core ratio of dielectric grains, while the dielectric grains have a small size.

One of the various effects of the present disclosure is to improve the effective permittivity of multilayer electronic components under voltage application conditions by minimizing a reduction rate of effective capacitance that may occur when voltage is applied.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including a dielectric layer including dielectric grains and internal electrodes alternately disposed with the dielectric layer in a first direction; and
external electrodes disposed on the body,
wherein at least one of the dielectric grains has a core-shell structure including an inner core and a shell covering at least a portion of the inner core,
a ratio of an average size of the inner core to an average size of the at least one dielectric grain having the core-shell structure is 0.4 or more and 0.8 or less,
a ratio ((Dy+Tb)/Sn) of a sum of a number of moles of dysprosium (Dy) and a number of moles of terbium (Tb) to a number of moles of tin (Sn) included in the dielectric layer satisfies 0.7 or more and 1.5 or less, and
the dielectric layer has four or more of the dielectric grains in the first direction.

2. The multilayer electronic component of claim 1, wherein, the dielectric layer has 4 or more and 7 or less of the dielectric grains along a straight line drawn in the first direction.

3. The multilayer electronic component of claim 1, wherein the average size of the dielectric grains is 100 nm or more and 300 nm or less.

4. The multilayer electronic component of claim 3, wherein a standard deviation of a size of the dielectric grains relative to the average size is ±100 nm or less.

5. The multilayer electronic component of claim 1, wherein a content of dysprosium (Dy) is higher in the shell than in the inner core.

6. The multilayer electronic component of claim 1, wherein the average size of the inner core is 50 nm or more and 200 nm or less.

7. The multilayer electronic component of claim 6, wherein a standard deviation of a size of the inner core relative to the average size is ±75 nm or less.

8. The multilayer electronic component of claim 1, wherein the number of moles of tin (Sn) relative to 100 moles of titanium (Ti) included in the dielectric layer is 1.0 mole or more and 2.0 mole or less.

9. The multilayer electronic component of claim 1, wherein the number of moles of dysprosium (Dy) relative to 100 moles of titanium (Ti) included in the dielectric layer is 0.7 moles or more and 1.5 moles or less.

10. The multilayer electronic component of claim 1, wherein the number of moles of terbium (Tb) relative to 100 moles of titanium (Ti) included in the dielectric layer is 0.2 moles or more and 1.55 moles or less.

11. The multilayer electronic component of claim 1, wherein the sum of the number of moles of dysprosium (Dy)

and the number of moles of terbium (Tb) relative to 100 moles of titanium (Ti) included in the dielectric layer is 1.1 moles or more and 2.25 moles or less.

12. The multilayer electronic component of claim 1, wherein the body includes first and second surfaces facing each other in the first direction, third and fourth surfaces connected to the first and second surfaces and facing each other in a second direction, and fifth and sixth surfaces connected to first to fourth surfaces and facing each other in a third direction, and includes a capacitance forming portion including the dielectric layer and the internal electrodes and a cover portion disposed on both end surfaces of the capacitance forming portion in the first direction.

13. The multilayer electronic component of claim 12, wherein the body includes side margin portions disposed on both end surfaces of the capacitance forming portion in the third direction.

14. The multilayer electronic component of claim 1, wherein an average size of the dielectric layer in the first direction is 0.6 μm or less.

15. The multilayer electronic component of claim 1, wherein a size of the multilayer electronic component is 1005, length×width: 1.0 mm×0.5 mm, or less.

16. A multilayer electronic component comprising:
a body including a dielectric layer including dielectric grains and internal electrodes alternately disposed with the dielectric layer in a first direction; and
external electrodes disposed on the body,
wherein at least one of the dielectric grains has a core-shell structure including an inner core and a shell covering at least a portion of the inner core, a ratio of an average size of the inner core to an average size of the at least one dielectric grain having the core-shell structure is 0.4 or more and 0.8 or less, a ratio (RE/Sn) of a number of moles of rare earth element (RE) to a number of moles of tin (Sn) included in the dielectric layer satisfies 0.7 or more and 1.5 or less, and the dielectric layer has four or more of the dielectric grains in the first direction.

17. The multilayer electronic component of claim 16, wherein the number of moles of tin (Sn) relative to 100 moles of titanium (Ti) included in the dielectric layer is 1.0 mole or more and 2.0 mole or less.

18. The multilayer electronic component of claim 17, wherein the rare earth element (RE) includes dysprosium (Dy) and terbium (Tb), and a number of moles of dysprosium (Dy) relative to 100 moles of titanium (Ti) included in the dielectric layer is 0.7 moles or more and 1.5 moles or less.

19. The multilayer electronic component of claim 18, wherein a number of moles of terbium (Tb) relative to 100 moles of titanium (Ti) included in the dielectric layer is 0.2 moles or more and 1.55 moles or less.

20. The multilayer electronic component of claim 19, wherein the sum of the number of moles of dysprosium (Dy) and the number of moles of terbium (Tb) relative to 100 moles of titanium (Ti) included in the dielectric layer is 1.1 moles or more and 2.25 moles or less.

* * * * *